United States Patent [19]
Hatch

[11] Patent Number: 4,954,683
[45] Date of Patent: Sep. 4, 1990

[54] PLASMA ARC GOUGER

[75] Inventor: Bruce O. Hatch, Lebanon, N.H.

[73] Assignee: Thermal Dynamics Corporation, West Lebanon, N.H.

[21] Appl. No.: 358,416

[22] Filed: May 26, 1989

[51] Int. Cl.[5] .............................................. B23K 9/00
[52] U.S. Cl. ............................ 219/121.5; 219/121.41; 219/121.48; 219/121.37; 219/68; 148/9.5
[58] Field of Search ........... 219/121.48, 121.5, 121.51, 219/121.52, 75, 70, 68, 121.37, 121.38, 121.59, 137 R; 148/9.5

[56] References Cited

U.S. PATENT DOCUMENTS

| | | | |
|---|---|---|---|
| 3,033,133 | 5/1962 | Kelley et al. | 110/22 |
| 3,059,860 | 10/1962 | Hohn | 239/423 |
| 3,204,075 | 8/1965 | Browning | 219/75 |
| 3,425,223 | 2/1969 | Browning | 60/203 |
| 4,090,057 | 5/1978 | Okada | 219/70 |
| 4,161,413 | 7/1979 | Fuhrhop | 148/9.5 |
| 4,187,409 | 2/1980 | Slate | 148/9.5 |
| 4,389,559 | 6/1983 | Rotolico et al. | 219/121 |
| 4,412,304 | 12/1983 | Bass et al. | 219/121 |
| 4,485,287 | 11/1984 | Hamasaki et al. | 219/70 |
| 4,577,461 | 3/1986 | Cann | 60/203.1 |
| 4,650,953 | 3/1987 | Eger et al. | 219/121 |
| 4,716,269 | 12/1987 | Carkhuff | 219/121 |
| 4,727,236 | 2/1988 | Hull et al. | 219/121 |
| 4,748,312 | 5/1988 | Hatch et al. | 219/121 |
| 4,775,774 | 10/1988 | Caneer, Jr. | 219/121.55 |

FOREIGN PATENT DOCUMENTS

| | | | |
|---|---|---|---|
| 0939894 | 1/1974 | Canada | 219/121.36 |
| 0738804 | 6/1980 | U.S.S.R. | 219/121.5 |

OTHER PUBLICATIONS

Document #1–Author: Thermal Dynamics Corp. Title: advertising brochure Date: 1988.
Document #2–Author: Thermal Dynamics Corp. Title: instruction manual for the Pak 10XR Date: Mar. 9, 1989.
Document #3–Author: L-Tec Welding & Cutting Systems Title: advertising brochure Date: Feb. 1987.
Document #4–Author: Arcair Company Title: advertising brochure for Air Carbon Arc Manual Torches Date: 1986.
Document #5–Author: R. L. Heflin Title: Plasma Arc Gouging of Aluminum Date: May 1985.

*Primary Examiner*—M. H. Paschall
*Attorney, Agent, or Firm*—Caruthers, Herzog, Crebs & McGhee

[57] ABSTRACT

This plasma arc torch includes an improved front end assembly to create an improved gouge path when compared with prior art plasma arc gougers. The front end assembly includes a unique secondary gas nozzle for distribution of the secondary gas in a partial radial blanket up to 300° around the plasma. Conventional nozzles distribute the seondary gas in a total, 360 degree, blanket around the plasma. An improved tip design is believed to develop an enlarged plasma stream to further enhance the gouging process.

12 Claims, 4 Drawing Sheets

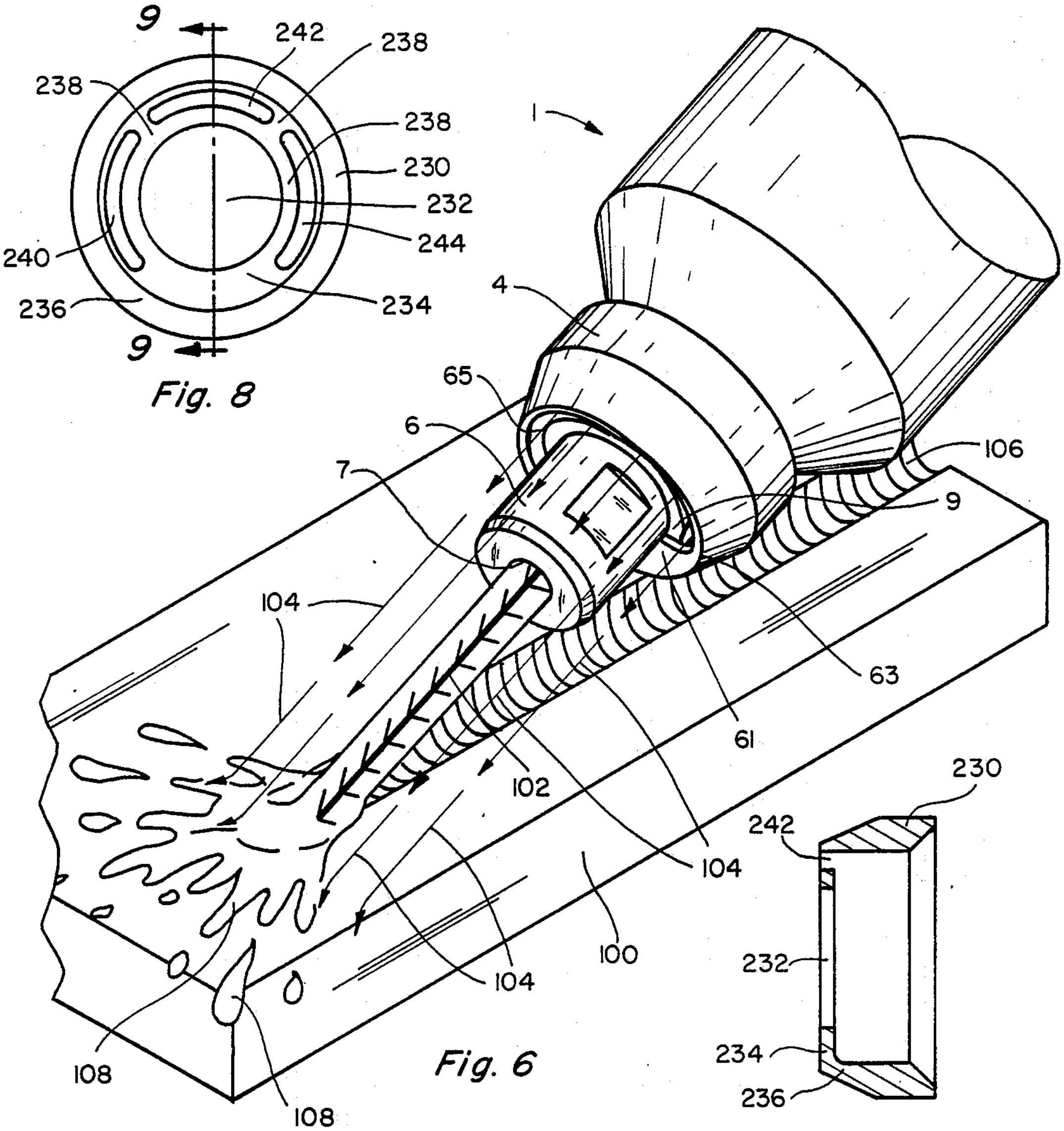
Fig. 6
Fig. 9
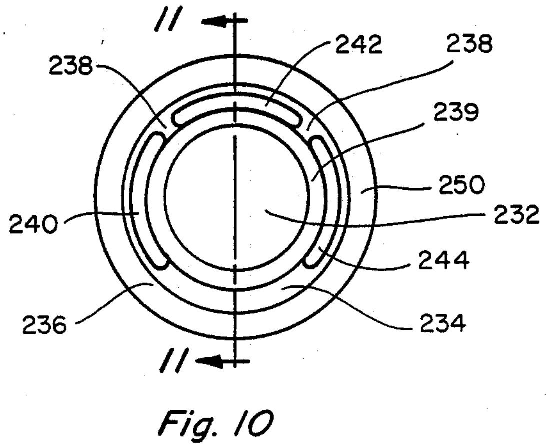
Fig. 10
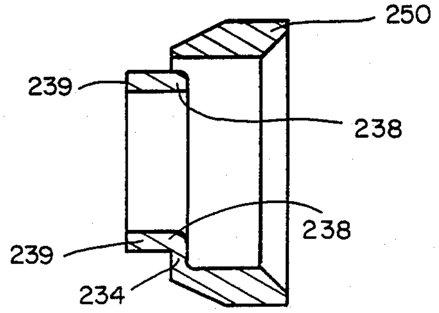
Fig. 11

PLASMA ARC GOUGER

BACKGROUND OF THE INVENTION

1. Field of the Invention

Plasma arc torches can be used for either cutting or gouging depending on the configuration of the torch. This invention relates to a plasma arc torch used in the gouging mode. More specifically this invention relates to an improved front end assembly specifically for gouging. The front end assembly on most torches can be easily removed and a different front end assembly can be installed so that the same torch can be used for either cutting or gouging. This invention focuses on an improved front end assembly for gouging including a secondary gas nozzle and tip.

2. Description of Prior Art

In a typical metal welding shop three primary tools are used for manufacturing metal products, i.e. cutting apparatus, welding apparatus, and gouging apparatus. Welding is, of course, the primary means of joining different pieces of metal. From time to time a weld will be improper or it will not meet specification. Welds which do not meet specification can sometimes be detected visually but are also detected by x-ray and other means. When it is necessary to remove a weld, a device known as a gouger is frequently employed for this purpose. Air carbon arc torches, such as those manufactured by the Arcair Company of Lancaster, Ohio are frequently employed for gouging. In addition to weld removal, these devices are also used for back gouging, edge preparation, defect repair, and many other metal removal jobs. A gouger is sometimes referred to in the industry as the welder's eraser.

Plasma arc torches are old in the art and have long been used for metal cutting. More recently, plasma arc torches have also been used in a gouging mode as an alternative to conventional air carbon arc gouging.

For example, Thermal Dynamics Corporation of West Lebanon, N.H. has offered a plasma arc torch, as described in the information disclosure statement, for both cutting and gouging. The same torch can be assembled with one type of front end assembly for cutting; it can be reassembled with a different front end assembly and used for gouging. L-TEC Welding & Cutting Systems of Florence, S.C. also offers a plasma arc torch for gouging as discussed more fully in the information disclosure statement. The L-TEC version of a plasma arc gouging torch is also thought to be convertible to a cutting mode.

The larger models of air carbon arc gougers can typically remove more metal at a faster pace than conventional plasma arc gougers. However, the air carbon arc devices are loud and produce a large amount of slag and debris. The slag and debris can be difficult to clean up unless the surrounding surface area has been pretreated with one of many release agents, well known in the industry. Also the air carbon-arc gouging process does not perform well on aluminum. In some situations, the plasma arc gouger is preferred to the air carbon arc gouger for various reasons.

Plasma gougers are generally not as noisy as air carbon arc gougers. The slag and debris created by plasma arc gougers is generally not as difficult to remove as the slag and debris created by an air carbon arc gouger. Because the plasma gougers do not use a carbon electrode, there is no expense associated with this type of consumable component. The operation of a plasma gouger is not disrupted by the need to repeatedly change a carbon electrode. The plasma gouger does not add undesirable carbon to the material being gouged. The plasma arc gouging process can gouge aluminum effectively. However, one drawback to conventional plasma gougers is the size and quality of the gouge path compared to the gouge path created by comparable air carbon arc gougers.

The present invention focuses on an improved front-end assembly for a plasma arc torch to enhance the size and quality of the gouge path.

SUMMARY OF THE INVENTION

This invention relates to an improved plasma arc gouging torch. The primary innovation focuses on an improved front end assembly including a redesigned secondary gas nozzle and tip. This improved front end assembly significantly increases the width of the gouge path compared to conventional plasma arc gouging torches; it also produces a smoother gouge path. This design also seems to do a better job of blowing away slag and debris. The improved front end assembly of this torch includes a secondary gas nozzle which directs the secondary gas in a partial blanket about the plasma stream. Conventional nozzles direct the secondary gas in a 360 degree blanket around the plasma stream. It is believed that the 360 degree blanket exerts a chilling and disruptive effect on the molten metal directly beneath the plasma stream. The improved nozzle distributes the secondary gas in a partial blanket up to 300° around the plasma stream which apparently does not have the cooling and disruptive effect of conventional nozzles. The improved tip has an enlarged orifice therein which is believed to cause the plasma stream to diverge into a broader path thereby creating a wider gouge. The tip is also thicker in cross-section than conventional tips which is believed to help insulate the plasma stream from the secondary gas thereby creating a slightly higher temperature in the plasma stream when it impacts the metal. Although the exact cause and effect relationship of the various design parameters is not precisely known the present invention does result in an improved gouge path when compared with conventional plasma arc gouging systems.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 is a perspective view of the torch shown in FIG. 2 gouging a path across a metal plate.

FIG. 7 is a section view of the plasma arc gouging torch in the manual mode with the improved front end assembly mounted thereon.

FIG. 8 is a frontal view of a secondary gas nozzle in a third alternative embodiment.

FIG. 9 is a cross-section view of the secondary gas nozzle along line 9—9 of FIG. 8.

FIG. 10 is a frontal view of a secondary gas nozzle in a fourth alternative embodiment.

FIG. 11 is a cross-section view of the secondary gas nozzle along line 11—11 of FIG. 10.

DESCRIPTION OF THE PREFERRED EMBODIMENT

Figure 1:
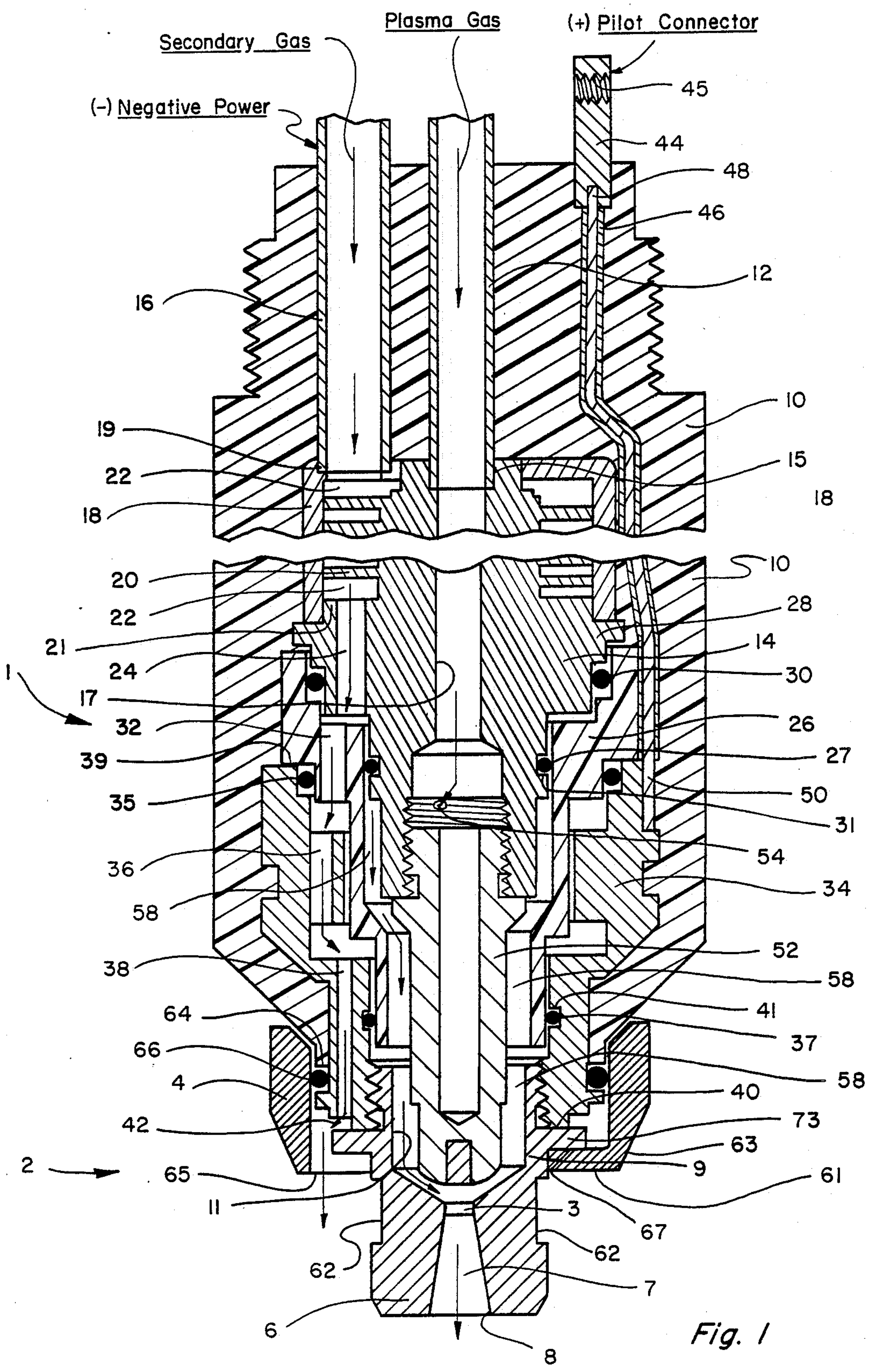
FIG. 1 is a section view of a conventional plasma arc torch with the improved front end assembly mounted thereon. Plasma arc torches can be configured in either a mechanical or a manual mode. This torch is configured in the mechanical mode so that it can be readily held by an automatic cutting machine or a robotic apparatus.

In FIG. 1, a plasma arc torch is generally identified by the numeral 1. The improved front end assembly is generally identified by the numeral 2 and includes the improved secondary gas nozzle 4 and the improved tip 6. Those skilled in the art of welding and cutting will recognize that the plasma arc torch 1 utilizes conventional components which will be described herein primarily for the sake of completeness; however, the invention focuses on the front end assembly 2 not the internal configuration of the torch 1. Those skilled in the art will recognize that the front end assembly 2 can be easily adapted to function on other torches with different internal configurations from that shown in FIG. 1.

Figure 7:
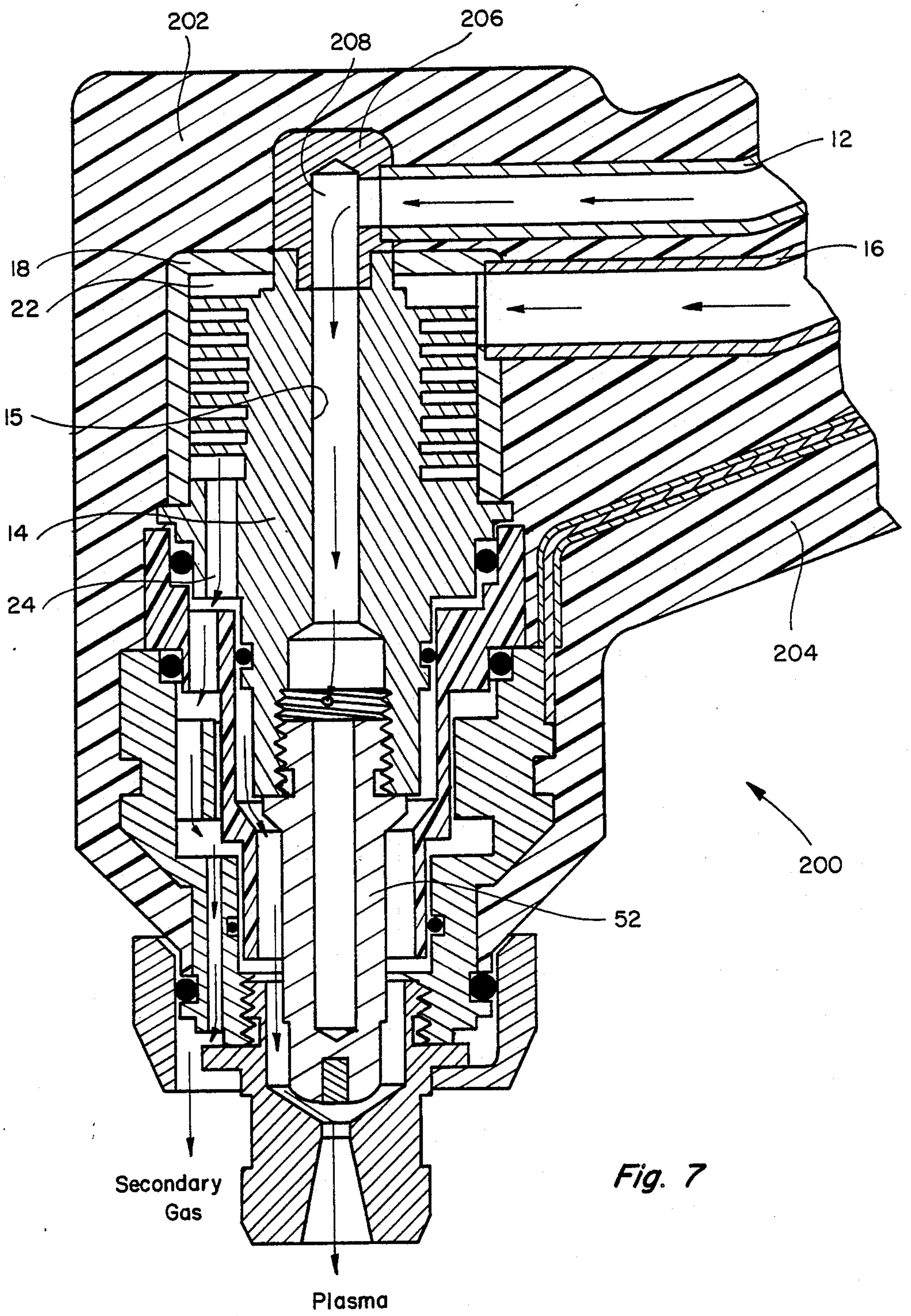
FIG. 7 shows the manual mode.

The plasma arc torch shown in FIG. 1 is designed for use in a mechanical mode with either an automatic cutting machine or a robotic apparatus. Those skilled in the art will recognize that the torch shown in FIG. 7 utilizes substantially the same internal components; however the torch in FIG. 7 is designed for the manual mode. The torch of FIG. 1 includes an nonconductive body 10 which is molded as an integral unit with all internal parts except for the removable secondary gas nozzle 4, the removable tip 6, a removable electrode 52, and a removable O-ring 66.

The torch includes an inlet conduit 12 for the plasma gas which eventually becomes plasma as it exits the torch. The conduit 12 engages a cathode body 14 at recess 15. Inlet conduit 12 is joined to the cathode body 14 by silver soldering or other conventional techniques known to those skilled in the art. A second inlet conduit 16 provides a passageway for the secondary gas. The conduit 16 is electrically conductive and connects to a conventional power supply not shown in the drawing but well known to those skilled in the art. Conduit 16 is typically silver soldered at inlet port 19 to the cap 18 as shown in the drawing.

The cathode body 14 has a plurality of radial fins 20 which are found on the exterior thereof in a helical configuration to create a spiral passageway 22 between the cap 18 and the cathode body 14. The cap is silver soldered to the cathode body 14 at the shoulder 21. Secondary gas enters the torch through the conduit 16 as indicated by the arrows in the drawing and then circulates through the spiral passageway 22 around the cathode body 14 to cool the cathode body 14. A longitudinal passageway 24 is formed in the cathode body 14 to allow the secondary gas to exit from the passageway 22 as shown by the arrow in the drawing.

A hollow central insulator 26 abuts the cathode body 1 at shoulder 28. A first O-ring 30 seals the central insulator 26 with the cathode body 14 adjacent the shoulder 28. A groove 31 is formed in the cathode body 14. A second O-ring 27 is positioned in the groove 31 and also seals the central insulator 26 with the cathode body 14 as shown in the drawing. The central insulator 26 has a longitudinal passageway 32 formed therein to receive the secondary gas exiting from longitudinal passageway 24 in the cathode body 14. The secondary gas passes through the central insulator 26 via the longitudinal passages 32 as shown by the arrow in the drawing.

The hollow anode 34 abuts the central insulator at shoulder 39 and is circumferentially disposed about the central insulator 26 as shown in the drawing. A third O-ring 35 seals the central insulator 26 with the anode 34 adjacent the shoulder 39; a groove 41 is formed in the anode 34 and receives a fourth O-ring 37. The O-ring 37 seals the central insulator 26 with the anode 34 as shown in the drawing. The anode has a plurality of longitudinal passageways 36 and 38 formed therein. The secondary gas passes from the longitudinal passageway 32 in the central insulator 26 through the longitudinal passages 36 and 38 in the anode 34 as shown by the arrows in the drawing. The distal end 40 of the anode 34 has a plurality of holes 42 disposed therein and better seen in FIG. 2 which allow the secondary gas to exit the anode shown by the arrows in the drawing.

A pilot connector 44 is molded into torch 1. A threaded hole 45 is formed in the pilot connector 44. A conductor 46 has a first end 48 and a second end 50. The first end 48 of the conductor 46 is connected to the pilot connector 44 as shown in the drawing. The second end 50 of the conductor 46 is connected to the anode 34 as shown in the drawing. Therefore, there is a complete electrical connection running from the pilot connector 44 through the conductor 46 to the anode 34. This is used for establishing the pilot arc which is well known and understood by those skilled in this industry.

An electrode 52 threadably engages the cathode body 14 as shown in the drawing. The cathode body 14 has one or more ports 54 therein. The outside diameter of the electrode 52 is smaller than the inside diameter of the hollow central insulator 26 thereby creating a plasma gas passageway 58.

Figure 2:
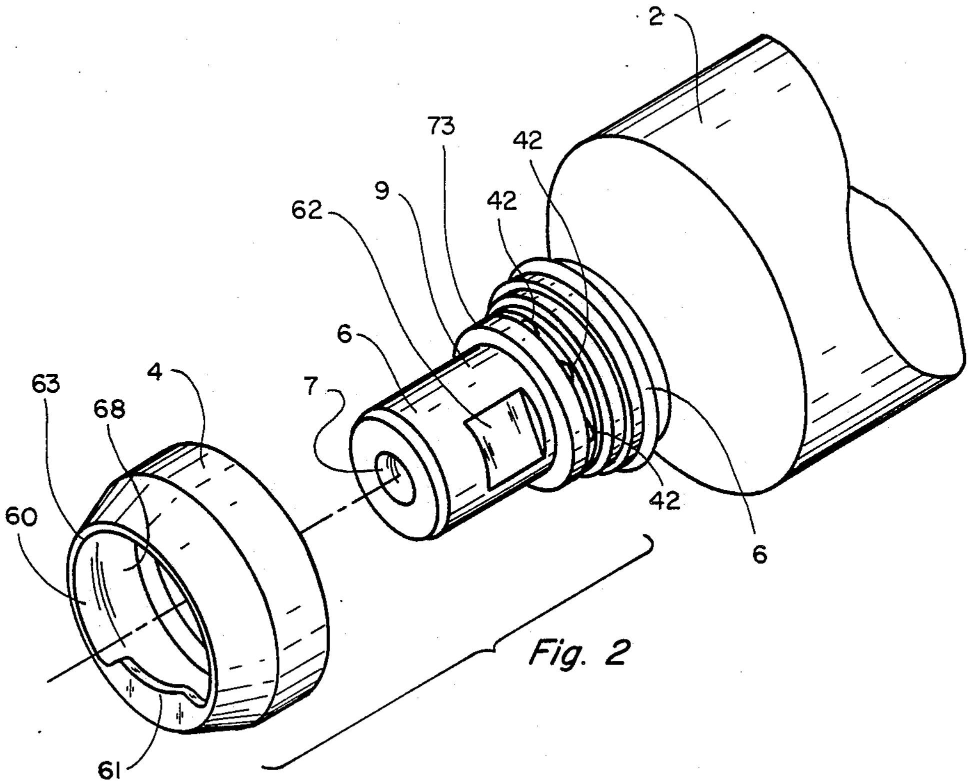
FIG. 2 is a perspective view of the torch shown in FIG. 1 with the secondary gas nozzle 4 removed so that the tip 6 may be clearly seen.

The preferred embodiment of the secondary gas nozzle 4 has a central aperture 60 formed therein better seen in FIG. 2. A radial abutment 61 extends from the rim 63 into the central aperture. The abutment is flush with the tip 6 at the shoulder 9.

The tip 6 has a longitudinal orifice 7 formed therein. The tip 6 has a blunt terminus on one end and recess 11 formed in the other end to receive the electrode 52. In the preferred embodiment, the orifice 7 is a frustroconical shape with the larger diameter at the exit, as shown in the drawing. However, other orifices with different shapes are also considered to be within the scope of this invention. The tip 6 threadably engages the anode 34 and abuts the distal end 40.

Prior art tips used for gouging had a cylindrical orifice with a diameter of approximately 0.078 inches for 70 amperes. Other types used for 105 amperes had a diameter of 0.093 inches and 0.113 inches. In the preferred embodiment, a diameter of approximately 0.082 inches is recommended at the location indicated by the numeral 3 and a diameter of approximately 0.150 inches is recommended at the location indicated by the numeral 8 for 105 amperes. The angle on the frustroconical surface is approximately 11 degrees from the centerline of the orifice.

The secondary gas nozzle 4 should preferably be constructed out of an electrically non-conductive material such as ceramic or high temperature plastic or phenolic. If the secondary gas nozzle is constructed out of an electrically conductive material and it is placed too close to the workpiece, an electric arc could jump from the nozzle to the workpiece thereby disrupting the gouging process and damaging torch parts. In the alternative, the exterior of the nozzle 4 could be coated with an electrically insulating material.

Plasma gas flows from the power supply through the conduit 12 as shown by the initial arrow labeled plasma gas. This gas then flows through a central bore 17 in the cathode body 14 as shown by the arrow in the drawing. The gas then passes through the port 54 in the cathode body into the plasma gas passageway 58 as shown by the arrows. Finally the gas is transformed by the electric arc into plasma as it exits the orifice 7 of tip 6 as shown by the final arrow in FIG. 1. The plasma gas passageway 58 is formed on one end between the electrode 52 and the central insulator 26 and the other end between the electrode 52 and the tip 6.

Secondary gas, which is typically air, flows through the conduit 16 to the torch. Secondary gas then enters the passageway 22, in the cathode body 14 which communicates with passageway 24. The secondary gas then passes through passageway 24 in the cathode body as shown by the arrow. The secondary gas then flows through the passageway 32 in the central insulator as shown by the arrow. The secondary gas then flows through the passageway 36 and passageway 38 in the anode 34 thus helping to cool the anode. Secondary gas then exits the anode 34 through the holes 42 to be directed towards the workpiece by the secondary gas nozzle 4.

In FIG. 2 the torch 1 is shown in exploded perspective view. The front end assembly 2 is indicated by the bracket. The front end assembly 2 includes the secondary gas nozzle 4 which has been removed from the torch 2 and the tip 6 which is shown connected to the torch. The secondary gas nozzle 4 has a central aperture 60. An abutment 61 extends into the central aperture 60. When gouging the abutment 61 should be placed nearest the gouge path to produce the desired results. Because the secondary gas nozzle 4 is removable, it can be easily adjusted so that the abutment 61 is adjacent to the gouge path, as best seen in FIG. 6.

The tip 6 has a longitudinal orifice 7 formed therein. A flat 62 is formed on opposing sides of the tip 6 so that it can be threadably engaged and disengaged with the anode 34 as best seen in FIG. 1.

The plurality of holes 42 can be seen in perspective view in FIG. 2 in the distal end 40 of the anode 34. A groove 64 is formed near the distal end 40 on the anode 34 to receive an O-ring 66. The circumferential interior diameter 68 of the secondary gas nozzle 4 engages the O-ring 66 in a friction fit allowing the secondary gas nozzle 4 to be removably mounted on the anode 34. This mounting feature also allows radial adjustment of the secondary gas nozzle 4 so that the abutment 61 is always adjacent to the gouge path.

Figure 3:
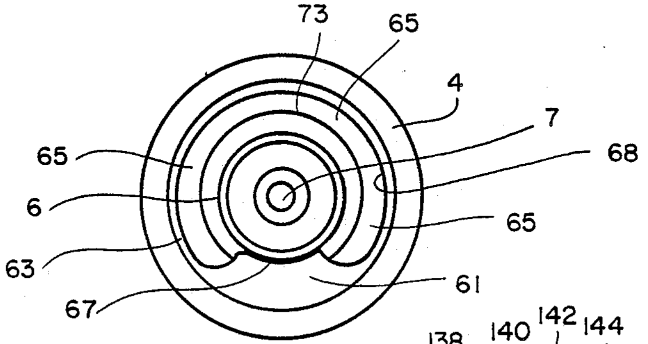
FIG. 3 is frontal view of the secondary gas nozzle shown in FIG. 2.

FIG. 3 is a front view of the secondary gas nozzle 4 with the tip 6 centered therein. The central aperture 60 is sized to allow the tip 6 to extend through the central aperture and project beyond the secondary gas nozzle 4 as best shown in FIG. 1. A portion of the central aperture 60 is blocked by the abutment 61. The lip 67 of the abutment 61 engages the shoulder 9 of tip 6. The abutment 61 also engages the radial shoulder 73 of the tip 6. A peripheral passageway 65 is formed between the tip 6 and the interior diameter 68 of the secondary gas nozzle 4. Secondary gas passes through this peripheral passageway 65 in a partial blanket about the tip 6 and the plasma gas. The radial abutment 61 blocks a portion of the peripheral passageway 65 to restrict the blanket of secondary gas to prevent complete encirclement of the tip 6 and the plasma gas.

Figure 4:
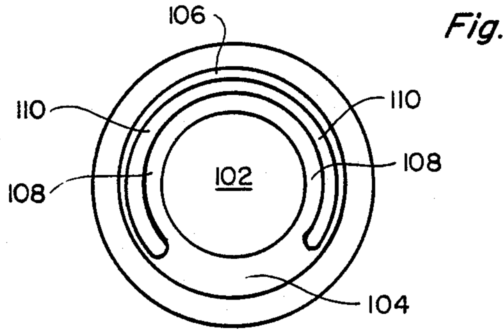
FIG. 4 is a frontal view of the secondary gas nozzle in a first alternative embodiment.
Figure 5:
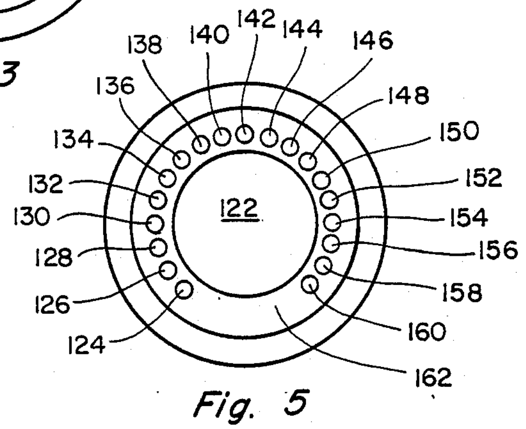
FIG. 5 is a frontal view of the secondary gas nozzle showing a second alternative embodiment.

The term peripheral passageway as used in this specification and the claims includes both a unified passageway as shown in FIG. 3 and 4 and a plurality of passageways as shown in FIGS. 5, 8 and 10.

FIG. 4, is a first alternative embodiment of the secondary gas nozzle 100. A central aperture 102 is sized to allow the tip 6 to pass through the aperture. An abutment 104 extends from the rim 106 and forms a circumferential web 108. A peripheral passageway 110 is defined by the web 108, the rim 106 and the abutment 104. Secondary gas passes through the peripheral passageway 110 in a partial blanket above the tip 6 and the plasma gas. The radial abutment 104 blocks a portion of the peripheral passageway 110 to restrict the blanket of secondary gas to prevent complete encirclement of the tip 6 and the plasma gas. This alternative configuration is primarily a matter of manufacturing convenience and is fully within the scope of this invention.

FIG. 5 is a second alternative embodiment of the secondary gas nozzle 120. A plurality of peripheral passageways 124, 126, 128, 130, 132, 134, 136, 138, 140, 142, 144, 146, 148, 150, 152, 154, 156, 158, and 160 partially encircle the central aperture 122 as shown in the drawing. Again the choice of a plurality of peripheral passageways 124-160 is largely a matter of manufacturing convenience. The main purpose of these peripheral apertures is to envelope the tip 6 and the stream of plasma with a partial blanket of secondary gas. The abutment 162 prevents the secondary gas from completely surrounding the tip 6 and the stream of plasma.

The purpose of the peripheral passageway 65 in FIG. 3, the peripheral passageway 110 in FIG. 4 or the plurality of peripheral passageways 124–160 is to envelope the stream of plasma with a partial blanket of secondary gas which extends approximately 240 to 300 degrees about the stream of plasma. The best mode is believed to be a partial blanket which surrounds the plasma stream for approximately 270 degrees. Peripheral passageways which result in encirclement of less than 240 degrees or more than 300 degrees are within the scope of this invention but do not constitute the best mode. The prior art teaches complete, 360 degree encirclement of the plasma stream by the secondary gas; an arrangement which achieves 360 degree encirclement is therefore not within the scope of this invention. The size and quality of the gouge path seems to deteriorate in a linear fashion as the size of the peripheral passageway moves away from 270 degrees.

FIG. 6 is a perspective view. The plasma arc torch 1 is being used to gouge a path 106 through a metal plate 100. A stream of plasma 102, as indicated by the dark line with a series of arrowheads, exits the orifice 7 of the tip 6. The secondary gas, indicated by the arrows 104, exits the peripheral passageway 65 in the secondary gas nozzle 4. The secondary gas, shown by the arrows 104, partially encircles the stream of plasma 102 as directed by the peripheral passageway 65. The secondary gas does not completely envelope the plasma stream 102 because of the abutment 61 The abutment 61 should always be oriented by the operator to the position nearest the gouge path as shown in the drawing.

The stream of plasma 102 has dug a gouge path 106 in the plate 100. The splatter and slag 108 is blown away from the gouge path or trough 106 by the partial blanket of secondary gas 104 indicated by the arrows. The secondary gas 104 envelopes the stream of plasma 102 in a partial blanket but does not blow on the trailing edge of the plasma stream because of the abutment 61.

FIG. 7 is a manual torch 200 which uses practically the same internal configuration as the mechanical torch shown in section view in FIG. 1. The torch 200 in FIG. 7 has a body 202 which extends into a handle portion 204. The torch 200 is manipulated by a human operator whereas the torch 1 is manipulated by an automatic cutting machine or robot. The plasma gas conduit 12 connects at a 90 degree connector 206. The connector 206 has a central bore 208 which communicates with the central bore 15 of the electrode body 14. Plasma gas therefore passes through the torch 200 in relatively the same fashion as the mechanical torch 1. Plasma gas enters through the conduit 12 shown by the arrows and passes through the bore 208 in the connector 206 as shown by the curved arrows. The plasma gas then passes down through the central bore 15 of the cathode body 14. The flow path thereafter is identical to the flow path of the torch shown in FIG. 1. The secondary gas enters the torch 200 through the conduit 16 which connects with the cap 18. The secondary gas then passes through the passageway 22 into the passageway 24 of the cathode body 14. The flow path of the secondary gas is thereafter identical to the flow path of the torch 1 previously described.

FIG. 8 is a third alternative embodiment of the nozzle 230. A central aperture 232 is sized to allow the tip 6 to pass through the aperture. An abutment 234 extends form the rim 236 and forms a circumferential web 238. A plurality of peripheral passageways 240, 242 and 244 are defined by the web 238, the rim 230 and the abutment 234. Secondary gas passes through the peripheral passageways 240, 242 and 244 in a partial blanket about the tip 6 and the plasma gas. The radial abutment 234 blocks a portion of the peripheral passageways 240 and 244 to restrict the blanket of secondary gas to prevent complete encirclement of the tip 6 and the stream of plasma gas.

FIG. 9 is a section view of the secondary nozzle 230.

FIG. 10 is a fourth alternative embodiment of the nozzle 250. A central aperture 232 is sized to allow the tip 6 to pass through the aperture. An abutment 234 extends from the rim 236. A tube 239 extends from and is a part of the web 238. A plurality of peripheral passageways 240, 242 and 244 are defined by the tube 239, the rim 230 and the abutment 234. Secondary gas passes through the peripheral passageways 240, 242 and 244 in a partial blanket about the tip 6 and the plasma gas. The radial abutment 234 blocks a portion of the peripheral passageways 240 and 244 to restrict the blanket of secondary gas to prevent complete encirclement of the tip 6 and the stream of plasma gas.

FIG. 11 is a section view of the nozzle 250. The tube 239 extends from the web 238.

OPERATION OF THE PREFERRED EMBODIMENT

Those skilled in the art of welding and cutting are familiar with the electrical operation of a plasma arc torch; however, for the sake of completeness, the electrical operation will be briefly described. The plasma arc torch 1 operates on a transferred arc principal. DC power is generated by a conventional power source, the positive side of the output of which is connected to the workpiece. The negative side of the output is conducted along the conduit 16 to the cap 18, and through the cathode body 14. The electricity then passes to the electrode 52 itself. The electrode is properly referred to as a cathode and the workpiece as an anode. The electricity arcs from the electrode to the workpiece through an ionized gas stream which is referred to as plasma. In order for this arc to be maintained, the torch tip must be approximately within ⅛— to 3/16—inch from the workpiece. This is referred to in the industry as a transferred arc. If the torch is moved away from the workpiece, the transferred arc ceases when the arcing distance becomes too long.

In order to start the torch, a pilot arc feature is provided and is well known to those skilled in the art. The pilot arc is initiated when the torch is some distance away from the workpiece. The operator depresses the torch control switch which creates a pilot arc from the electrode which serves as a cathode to the tip which serves as an anode. An electrical circuit is formed between the electrode, the tip or anode, the conductor 46, the pilot connector 44 and the power supply. When the switch is initially depressed, an initial high voltage creates an arc between the electrode and the tip which is referred to in the industry as the pilot arc. When the tip comes within approximately ⅛-inch of the workpiece, a cutting arc initiates from the electrode to the workpiece through the plasma stream. Once the cutting arc is established, a sensor in the power supply automatically cuts off the pilot arc as long as the trigger is depressed. If the torch is moved approximately ½-inch or more away from the workpiece, the cutting arc will stop and the pilot arc will automatically resume due to appropriate sensors and control mechanisms in the power supply. The sensors and control mechanisms are well known to those skilled in the art and are not the subject of this invention.

While the foregoing is directed to the preferred embodiment of the present invention, other and further embodiments of the invention may be devised without departing from the basic scope thereof, and the scope thereof is determined by the claims which follow.

What is claimed is:

1. A front end assembly for a plasma arc torch utilizing an electrode, a plasma gas stream and a secondary gas stream comprising:

a. a tip for gouging having:
   i. an elongated barrel with a first end and a second end;
   ii. said first end forming a hollow recess sized to enclose a portion of said electrode; and
   iii. said second end forming an orifice for the passage of said plasma gas stream;
b. a secondary gas nozzle for gouging having:
   i. a central aperture in said nozzle sized to allow said tip to extend through said central aperture;

ii. a peripheral passageway directing said secondary gas stream in a blanket about said tip and said plasma gas stream as it exits said orifice; and iii. a radial abutment blocking a portion of said peripheral passageway to restrict said blanket and prevent complete enrichment of said plasma gas stream.

2. The apparatus of claim 1 wherein said radial abutment blocks up to 120° of said peripheral passageway.

3. The apparatus of claim 2 further including:

a. means to removably attach said tip to said plasma arc torch; and b. means to removably attach said secondary gas nozzle to said plasma arc torch.

4. The apparatus of claim 3 wherein said secondary gas nozzle is formed from an electrically non-conductive material.

5. The apparatus of claim 3 wherein the exterior surface of said secondary gas nozzle is formed from an electrically nonconductive material.

6. A secondary gas nozzle for use with a plasma arc gouging torch, said torch utilizing a plasma gas and a secondary gas and said torch containing a tip having an orifice therein for the passage of said plasma gas, comprising: means of directing said secondary gas in a partial radial blanket about said plasma gas as it exits said orifice, said partial radial blanket extending up to 300° about said plasma gas.

7. A plasma arc torch adapted to be operated as a gouger utilizing a plasma gas and a secondary gas comprising:

a. a body;

b. an electrode mounted in said body;

c. a tip mounted in said body and electrically insulated from said electrode, said tip having an orifice therein;

d. a plasma gas passageway between said electrode and said tip allowing said plasma gas to pass through said passageway and thereafter to exit through said orifice in said tip;

e. a secondary gas passageway having an inlet and an outlet;

f. a secondary gas nozzle positioned at said outlet of said secondary gas passageway, said secondary gas nozzle directing said secondary gas in a radial blanket about said plasma gas as it exits said orifice of said tip; and g. said secondary gas nozzle having a radial abutment to obstruct a portion of said radial blanket and prevent complete encirclement of said plasma gas stream.

8. The apparatus of claim 7 wherein said abutment obstructs up to 120° of said radial blanket.

9. The apparatus of claim 8 wherein said secondary gas nozzle is removably mounted in a friction fit on said body of said torch.

10. The apparatus of claim 9 wherein said tip comprises:

a. an elongate barrel having a first end and a second end;

b. said first end forming a hollow recess sized to enclose a portion of said electrode; and c. said second end forming an orifice for the passage of plasma gas.

11. The apparatus of claim 10 wherein said orifice is formed in a frustroconical shape having its largest diameter at said second end.

12. A plasma gouging torch utilizing a plasma gas and a secondary gas comprising:

a. a body;

b. an electrode mounted in said body;

c. a tip mounted in said body and electrically insulated from said electrode, said tip having an orifice therein;

d. a plasma gas passageway between said electrode and said tip allowing said plasma gas to pass through said passageway and thereafter to exit through said orifice in said tip;

e. a secondary gas conduit having an inlet and an outlet; and f. means for directing said secondary gas in a partial blanket about said plasma gas as it exits said orifice of said tip.

* * * * *